(12) United States Patent
Zhou et al.

(10) Patent No.: US 11,601,977 B2
(45) Date of Patent: Mar. 7, 2023

(54) TECHNIQUES FOR COLLISION PRIORITIZATION BASED ON PHYSICAL LAYER PRIORITY

(71) Applicant: QUALCOMM Incorporated, San Diego, CA (US)

(72) Inventors: Yan Zhou, San Diego, CA (US); Tao Luo, San Diego, CA (US); Peter Gaal, San Diego, CA (US); Seyedkianoush Hosseini, San Diego, CA (US); Jing Sun, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/248,604

(22) Filed: Jan. 29, 2021

(65) Prior Publication Data

US 2021/0315011 A1 Oct. 7, 2021

Related U.S. Application Data

(60) Provisional application No. 63/005,039, filed on Apr. 3, 2020.

(51) Int. Cl.
*H04W 74/08* (2009.01)
*H04W 72/12* (2023.01)
(Continued)

(52) U.S. Cl.
CPC ... *H04W 74/0816* (2013.01); *H04W 72/0446* (2013.01); *H04W 72/10* (2013.01); *H04W 72/1242* (2013.01)

(58) Field of Classification Search
CPC ......... H04W 74/0816; H04W 72/0446; H04W 72/10; H04W 72/1242; H04L 5/0092;
(Continued)

(56) References Cited

U.S. PATENT DOCUMENTS

2013/0315159 A1 11/2013 Xia et al.
2017/0034850 A1 2/2017 Rico et al.
(Continued)

OTHER PUBLICATIONS

Intel Corporation: "Remaining Details on GC PDCCH and Dynamic SFI," 3GPP Draft, 3GPP TSG RAN WG1 Meeting #93, R1-1807624 Intel GC-PDCCH_Updated, 3rd Generation Partnership Project (3GPP), Mobile Competence Centre, 650, Route Des Lucioles, F-06921, Sophia-Antipolis Cedex, France, vol. RAN WG1. No. Busan, Korea, May 21, 2018-May 25, 2018, May 20, 2018 (May 20, 2018), XP051442623, 6 pages, Retrieved from the Internet: URL: http://www.3gpp.org/ftp/Meetings%5F3GPP%5FSYNC/RAN1/Docs/ [retrieved on May 20, 2018] p. 4.
(Continued)

*Primary Examiner* — Brandon M Renner
(74) *Attorney, Agent, or Firm* — Dalei Dong; Harrity & Harrity, LLP

(57) ABSTRACT

A user equipment (UE) may receive a first indication of a configured communication for a first set of symbols. The UE may detect a second indication associated with a second set of symbols. The UE may determine that a direction of the configured communication is different from an indicated direction for the second set of symbols, the second set of symbols at least partially overlapping the first set of symbols. The UE may cancel the configured communication or may communicate the configured communication based at least in part on a physical layer priority of the configured communication and based at least in part on the determination that the direction of the configured communication is different from the indicated direction for the second set of symbols.

28 Claims, 10 Drawing Sheets

(51) Int. Cl.
*H04W 72/0446* (2023.01)
*H04W 72/10* (2009.01)

(58) Field of Classification Search
CPC ... H04L 5/0053; H04L 5/0064; H04L 1/1861; H04L 1/1864; H04L 1/1854
See application file for complete search history.

(56) References Cited

U.S. PATENT DOCUMENTS

| | | | | |
|---|---|---|---|---|
| 2018/0310333 | A1* | 10/2018 | Akkarakaran | H04W 72/1278 |
| 2019/0200351 | A1* | 6/2019 | Sun | H04L 5/0057 |
| 2019/0261454 | A1 | 8/2019 | Xiong et al. | |
| 2019/0313476 | A1* | 10/2019 | Sun | H04W 76/27 |
| 2020/0322971 | A1* | 10/2020 | Jung | H04L 5/003 |
| 2020/0367254 | A1* | 11/2020 | Han | H04L 5/0055 |
| 2021/0385826 | A1* | 12/2021 | Moon | H04L 5/0007 |
| 2022/0029748 | A1* | 1/2022 | Fu | H04L 5/0055 |
| 2022/0095337 | A1* | 3/2022 | Wang | H04L 1/1861 |
| 2022/0123902 | A1* | 4/2022 | Panteleev | H04L 5/0053 |

OTHER PUBLICATIONS

Intel Corporation: "UCI Enhancements for eURLLC," 3GPP Draft, 3GPP TSG RAN WG1 #98bis, R1-1910661, Intel—eURLLC UCI_Enhancements_Final, 3rd Generation Partnership Project (3GPP), Mobile Competence Centre, 650, Route Des Lucioles, F-06921, Sophia-Antipolis Cedex, France, vol. RAN WG1. No. Chongqing. China, Oct. 14, 2019-Oct. 20, 2019, Oct. 8, 2019 (Oct. 8, 2019), XP051809177, 15 pages, Retrieved from the Internet: URL: https://ftp.3gpp.org/tsg_ran/WG1_RL1/TSGR1_98b/Docs/R1-1910661.zip R1-1910661 Intel—eURLLC UCI_Enhancements_Final.doc [retrieved on Oct. 8, 2019]—p. 7-p. 8.
International Search Report and Written Opinion—PCT/US2021/070108—ISA/EPO—dated Apr. 20, 2021.
Samsung: "Summary of Collision Handling Aspects for LC/CE UEs", 3GPP Draft, 3GPP TSG RAN WG1 #84, R1-161249, Collision Handling Summary, 3rd Generation Partnership Project (3GPP), Mobile Competence Centre, 650, Route Des Lucioles, F-06921, Sophia-Antipolis Cedex, France, vol. RAN WG1. No. St Julians, Malta, Feb. 15, 2016-Feb. 19, 2016, Feb. 17, 2016 (Feb. 17, 2016), XP051054516, 13 pages, Retrieved from the Internet: URL:http://www.3gpp.org/ftp/Meetings_3GPP_SYNC/RAN1/Docs/ [retrieved on Feb. 17, 2016] p. 7.

* cited by examiner

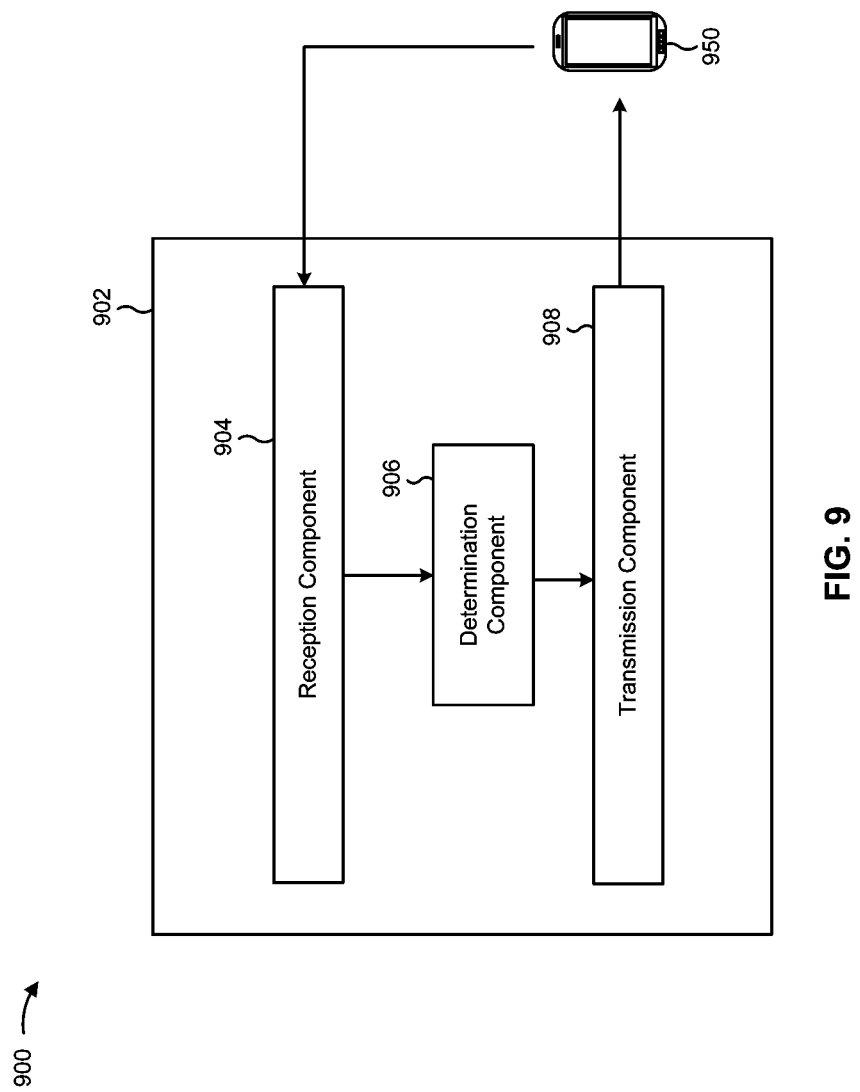

TECHNIQUES FOR COLLISION PRIORITIZATION BASED ON PHYSICAL LAYER PRIORITY

CROSS-REFERENCE TO RELATED APPLICATION

This Patent application claims priority to U.S. Provisional Patent Application No. 63/005,039 filed on Apr. 3, 2020, entitled "TECHNIQUES FOR COLLISION PRIORITIZATION BASED ON PHYSICAL LAYER PRIORITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for collision prioritization based on physical layer (PHY) priority.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving a first indication of a configured communication for a first set of symbols; detecting a second indication associated with a second set of symbols; determining that a direction of the configured communication is different from an indicated direction for the second set of symbols, the second set of symbols at least partially overlapping the first set of symbols; and cancelling the configured communication based at least in part on a physical layer (PHY) priority of the configured communication and based at least in part on the determination that the direction of the configured communication is different from the indicated direction for the second set of symbols.

In some aspects, the second indication is a slot format indicator included in downlink control information.

In some aspects, the configured communication is canceled based at least in part on a determination that the PHY priority of the configured communication is a low PHY priority.

In some aspects, the second indication is a dynamic grant associated with the second set of symbols.

In some aspects, the configured communication is canceled based at least in part on a determination that the PHY priority of the configured communication is equal to or lower than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a method of wireless communication, performed by a user equipment, may include receiving a first indication of a configured communication for a first set of symbols; detecting a second indication associated with a second set of symbols; determining that a direction of the configured communication is different from an indicated direction for the second set of symbols, the second set of symbols at least partially overlapping the first set of symbols; and communicating the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is communicated based at least in part on a determination that the PHY priority of the configured communication is not a low PHY priority.

In some aspects, the second indication is a dynamic grant associated with the second set of symbols.

In some aspects, the configured communication is communicated based at least in part on a determination that the PHY priority of the configured communication is higher than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a method of wireless communication, performed by a base station, may include determining a direction for a second set of symbols based at least in part on a PHY priority of a configured communication, the second set of symbols at least partially overlapping a first set of symbols to be used for the configured communication; and providing an indication associated with the second set of symbols, the indication including information indicating the direction for the second set of symbols.

In some aspects, the indication is a slot format indicator included in downlink control information.

In some aspects, the direction for the second set of symbols is permitted to be different from the direction of the configured communication when the PHY priority of the configured communication is a low PHY priority.

In some aspects, the indication is a dynamic grant associated with the second set of symbols.

In some aspects, the direction for the second set of symbols is permitted to be different from the direction of the configured communication when the PHY priority of the configured communication is equal to or lower than a PHY priority of a communication scheduled with the direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a UE for wireless communication may include a memory and one or more processors coupled to the memory. The memory and the one or more processors may be configured to receive a first indication of a configured communication for a first set of symbols; detect a second indication associated with a second set of symbols; determine that a direction of the configured communication is different from an indicated direction for the second set of symbols, the second set of symbols at least partially overlapping the first set of symbols; and cancel the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is canceled based at least in part on a determination that the PHY priority of the configured communication is a low PHY priority.

In some aspects, the second indication is a dynamic grant associated with the second set of symbols.

In some aspects, the configured communication is canceled based at least in part on a determination that the PHY priority of the configured communication is equal to or lower than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a UE for wireless communication may include a memory and one or more processors coupled to the memory. The memory and the one or more processors may be configured to receive a first indication of a configured communication for a first set of symbols; detect a second indication associated with a second set of symbols; determine that a direction of the configured communication is different from an indicated direction for the second set of symbols, the second set of symbols at least partially overlapping the first set of symbols; and communicate the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is communicated based at least in part on a determination that the PHY priority of the configured communication is not a low PHY priority.

In some aspects, the second indication is a dynamic grant associated with the second set of symbols.

In some aspects, the configured communication is communicated based at least in part on a determination that the PHY priority of the configured communication is higher than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a base station for wireless communication may include a memory and one or more processors coupled to the memory. The memory and the one or more processors may be configured to determine a direction for a second set of symbols based at least in part on a PHY priority of a configured communication, the second set of symbols at least partially overlapping a first set of symbols to be used for the configured communication; and provide an indication associated with the second set of symbols, the indication including information indicating the direction for the second set of symbols.

In some aspects, the indication is a slot format indicator included in downlink control information.

In some aspects, the direction for the second set of symbols is permitted to be different from the direction of the configured communication when the PHY priority of the configured communication is a low PHY priority.

In some aspects, the indication is a dynamic grant associated with the second set of symbols.

In some aspects, the direction for the second set of symbols is permitted to be different from the direction of the configured communication when the PHY priority of the configured communication is equal to or lower than a PHY priority of a communication scheduled with the direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a non-transitory computer-readable medium may store one or more instructions for wireless communication. The one or more instructions, when executed by one or more processors of a UE, may cause the one or more processors to receive a first indication of a configured communication for a first set of symbols; detect a second indication associated with a second set of symbols; determine that a direction of the configured communication is different from an indicated direction for the second set of symbols, the second set of symbols at least partially overlapping the first set of symbols; and cancel the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is canceled based at least in part on a determination that the PHY priority of the configured communication is a low PHY priority.

In some aspects, the second indication is a dynamic grant associated with the second set of symbols.

In some aspects, the configured communication is canceled based at least in part on a determination that the PHY priority of the configured communication is equal to or lower than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a non-transitory computer-readable medium may store one or more instructions for wireless communication. The one or more instructions, when executed by one or more processors of a UE, may cause the one or more processors to receive a first indication of a configured communication for a first set of symbols; detect a second indication associated with a second set of symbols; determine that a direction of the configured communication is different from an indicated direction for the second set of symbols, the second set of symbols at least partially overlapping the first set of symbols; and communicate the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is communicated based at least in part on a determination that the PHY priority of the configured communication is not a low PHY priority.

In some aspects, the second indication is a dynamic grant associated with the second set of symbols.

In some aspects, the configured communication is communicated based at least in part on a determination that the PHY priority of the configured communication is higher than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, a non-transitory computer-readable medium may store one or more instructions for wireless communication. The one or more instructions, when executed by one or more processors of a base station, may cause the one or more processors to determine a direction for a second set of symbols based at least in part on a PHY priority of a configured communication, the second set of symbols at least partially overlapping a first set of symbols to be used for the configured communication; and provide an indication associated with the second set of symbols, the indication including information indicating the direction for the second set of symbols.

In some aspects, the indication is a slot format indicator included in downlink control information.

In some aspects, the direction for the second set of symbols is permitted to be different from the direction of the configured communication when the PHY priority of the configured communication is a low PHY priority.

In some aspects, the indication is a dynamic grant associated with the second set of symbols.

In some aspects, the direction for the second set of symbols is permitted to be different from the direction of the configured communication when the PHY priority of the configured communication is equal to or lower than a PHY priority of a communication scheduled with the direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, an apparatus for wireless communication may include means for receiving a first indication of a configured communication for a first set of symbols; means for detecting a second indication associated with a second set of symbols; means for determining that a direction of the configured communication is different from an indicated direction for the second set of symbols, the second set of symbols at least partially overlapping the first set of symbols; and means for cancelling the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is canceled based at least in part on a determination that the PHY priority of the configured communication is a low PHY priority.

In some aspects, the second indication is a dynamic grant associated with the second set of symbols.

In some aspects, the configured communication is canceled based at least in part on a determination that the PHY priority of the configured communication is equal to or lower than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, an apparatus for wireless communication may include means for receiving a first indication of a configured communication for a first set of symbols; means for detecting a second indication associated with a second set of symbols; means for determining that a direction of the configured communication is different from an indicated direction for the second set of symbols, the second set of symbols at least partially overlapping the first set of symbols; and means for communicating the configured communication based at least in part on a PHY priority of the configured communication and based at least in part on the determination that the direction of the configured communication is different from the indicated direction for the second set of symbols.

In some aspects, the second indication is a slot format indicator included in downlink control information.

In some aspects, the configured communication is communicated based at least in part on a determination that the PHY priority of the configured communication is not a low PHY priority.

In some aspects, the second indication is a dynamic grant associated with the second set of symbols.

In some aspects, the configured communication is communicated based at least in part on a determination that the PHY priority of the configured communication is higher than a PHY priority of a communication scheduled with the indicated direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

In some aspects, an apparatus for wireless communication may include means for determining a direction for a second set of symbols based at least in part on a PHY priority of a configured communication, the second set of symbols at least partially overlapping a first set of symbols to be used for the configured communication; and means for providing an indication associated with the second set of symbols, the indication including information indicating the direction for the second set of symbols.

In some aspects, the indication is a slot format indicator included in downlink control information.

In some aspects, the direction for the second set of symbols is permitted to be different from the direction of the configured communication when the PHY priority of the configured communication is a low PHY priority.

In some aspects, the indication is a dynamic grant associated with the second set of symbols.

In some aspects, the direction for the second set of symbols is permitted to be different from the direction of the configured communication when the PHY priority of the configured communication is equal to or lower than a PHY priority of a communication scheduled with the direction for the second set of symbols.

In some aspects, the direction of the configured communication is a downlink direction and the direction associated with the second set of symbols is an uplink direction or a flexible direction.

In some aspects, the direction of the configured communication is an uplink direction and the direction associated with the second set of symbols is a downlink direction or a flexible direction.

Aspects generally include a method, apparatus, system, computer program product, non-transitory computer-readable medium, user equipment, base station, wireless communication device, or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a block diagram of an example apparatus for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
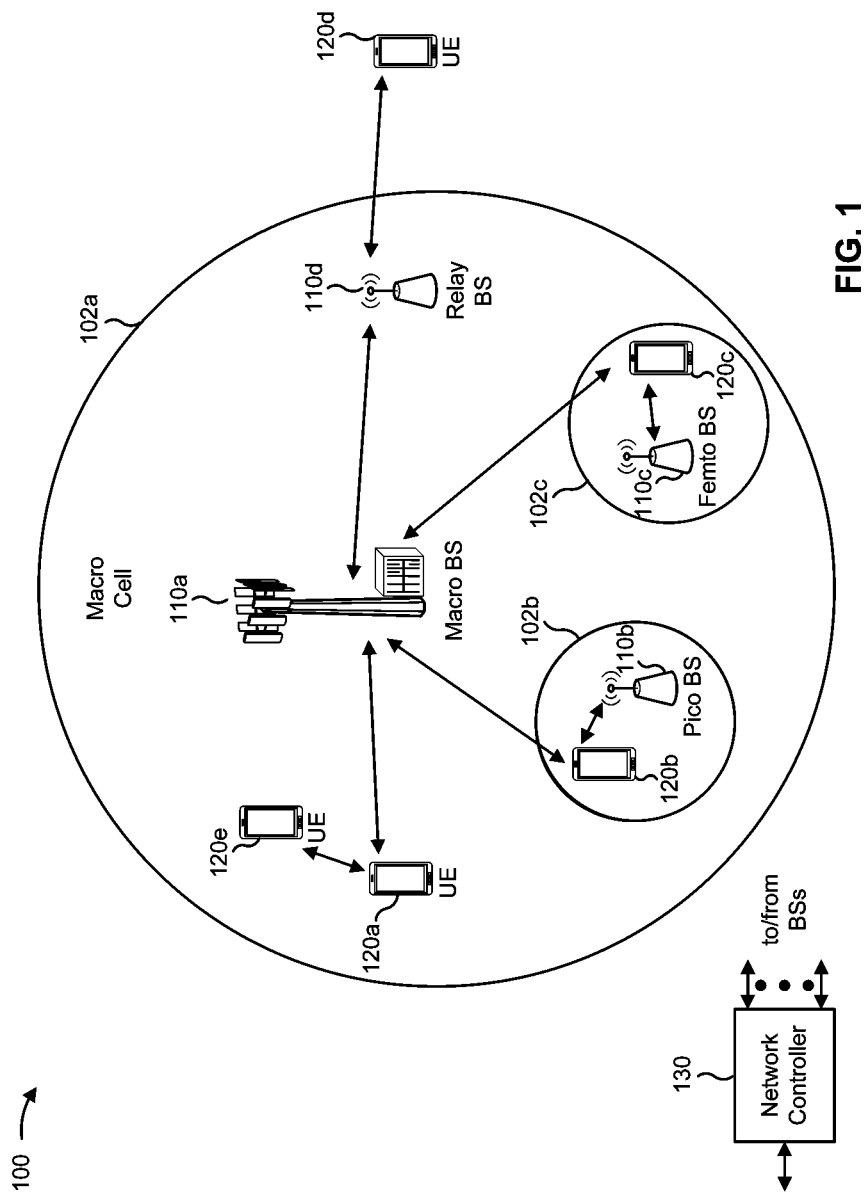
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
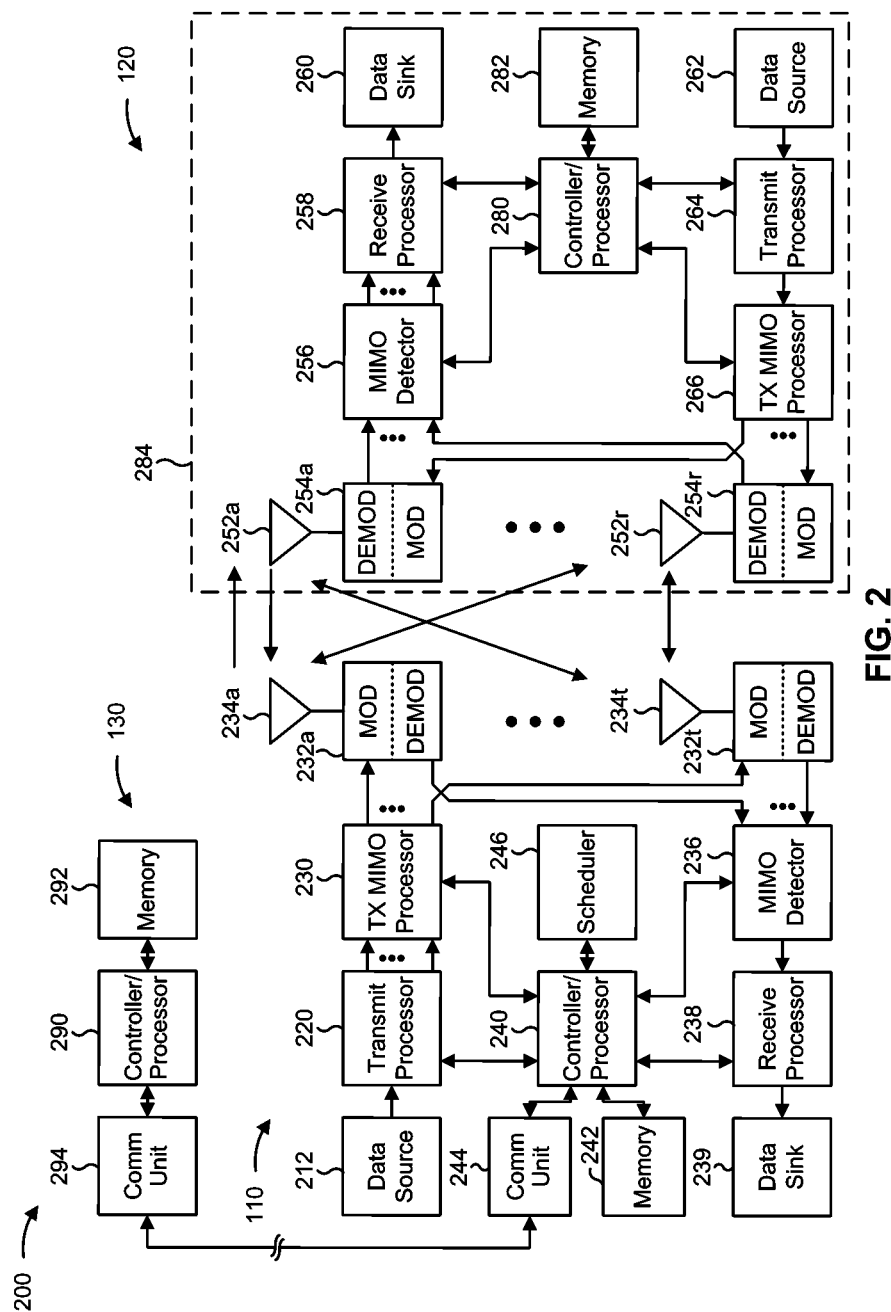
FIG. 2 is a diagram illustrating an example of a base station in communication with a UE in a wireless network, in accordance with the present disclosure.

FIG. 2 is a block diagram illustrating an example 200 of base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP) parameter, a received signal strength indicator (RSSI) parameter, a reference signal received quality (RSRQ) parameter, a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with collision prioritization based on physical layer (PHY) priority, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, and/or other processes as described herein. In some aspects, executing instructions may include running the instructions, converting the instructions, compiling the instructions, and/or interpreting the instructions.

In some aspects, UE 120 may include means for receiving a first indication of a configured communication for a first set of symbols; means for detecting a second indication associated with a second set of symbols; means for determining that a direction of the configured communication is different from an indicated direction for the second set of symbols, the second set of symbols at least partially overlapping the first set of symbols; means for cancelling the configured communication based at least in part on a PHY priority of the configured communication and based at least in part on the determination that the direction of the configured communication is different from the indicated direction for the second set of symbols; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving a first indication of a configured communication for a first set of symbols; means for detecting a second indication associated with a second set of symbols; means for determining that a direction of the configured communication is different from an indicated direction for the second set of symbols, the second set of symbols at least partially overlapping the first set of symbols; means for communicating the configured communication based at least in part on a PHY priority of the configured communication and based at least in part on the determination that the direction of the configured communication is different from the indicated direction for the second set of symbols; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a direction for a second set of symbols based at least in part on a PHY priority of a configured communication, the second set of symbols at least partially overlapping a first set of symbols to be used for the configured communication; means for providing an indication associated with the second set of symbols, the indication including information indicating the direction for the second set of symbols; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a wireless communication system, a PHY priority associated with an uplink communication (herein referred to as an uplink PHY priority) can be indicated or determined as either a high priority or a low priority (i.e., a two-level PHY priority scheme may be used). A manner in which an uplink PHY priority is configured, indicated, or determined depends on a type of the uplink communication. For example, an uplink PHY priority for a scheduling request can be configured per scheduling request resource. As another example, an uplink PHY priority for a (periodic or semi-persistent) channel state information (CSI) report on a physical uplink control channel (PUCCH) may defined as a low priority. As another example, an uplink PHY priority for a (semi-persistent or aperiodic) CSI report on a physical uplink shared channel (PUSCH) can be determined to be the same as an uplink PHY priority indicated for PUSCH. As another example, an uplink PHY priority for an uplink dynamic grant can be indicated in downlink control information (DCI). As another example, an uplink PHY priority for an uplink configured grant can be radio resource control (RRC) configured per type-1 and type-2 configured grant configuration. Here, activation or reactivation DCI cannot overwrite the RRC configured priority. As another example, an uplink PHY priority for an acknowledgment (ACK)/ negative acknowledgment (NACK) of a downlink dynamic grant can be indicated in DCI. As another example, an uplink PHY priority for an ACK/NACK of a semi-persistent scheduled (SPS) communication can be RRC configured per SPS configuration. As another example, an uplink PHY priority for a physical random access channel (PRACH) may not defined. As another example, an uplink PHY priority for a sounding reference signal (SRS) may be determined to be a low priority for a periodic/semi-persistent SRS and an aperiodic SRS triggered by DCI format 2_3.

In some wireless communication systems, signaling of a downlink PHY priority is also supported (e.g., using a two-level priority scheme). For a physical downlink control channel (PDCCH), a downlink PHY priority can be indicated per control resource set (CORESET) or synchronization signal (SS) (e.g., in an RRC information element of a CORESET), per CORESET pool index (e.g., when different pool indices are configured), or in the PDCCH itself. For a downlink channel or reference signal associated with uplink feedback (e.g., a physical downlink shared channel (PDSCH) associated with an ACK/NACK, a CSI reference signal (CSI-RS) associated with a CSI report on a PUCCH/ PUSCH, or the like), a downlink PHY priority can be determined to be the same as an uplink PHY priority indicated for the uplink feedback. For a downlink channel or reference signal scheduled by DCI (e.g., a PDSCH, an aperiodic CSI-RS), a downlink PHY priority can be indicated in DCI (e.g., regardless of whether there is uplink feedback associated with the downlink channel or reference signal). For a downlink channel or reference signal configured by RRC, activated by DCI, or activated by a medium access control control element (MAC-CE) (e.g., an SPS communication, a periodic/semipersistent CSI-RS, or the like), a downlink PHY priority can be configured in a corresponding RRC information element or can be indicated in activation DCI/MAC-CE.

Additionally, in some scenarios, a set of symbols associated with a configured communication may at least partially overlap with a set of symbols for which an indicated direction differs from that associated with the configured communication. For example, a set of symbols in which a UE is configured to receive a downlink communication may at least partially overlap (i.e., collide with) a set of symbols for which an indicated direction is uplink or flexible. As another example, set of symbols in which a UE is configured to transmit an uplink communication may at least partially overlap a set of symbols for which an indicated direction is downlink or flexible. Such a collision may result in unwanted or undesirable cancellation of the configured communication.

Figure 3A:
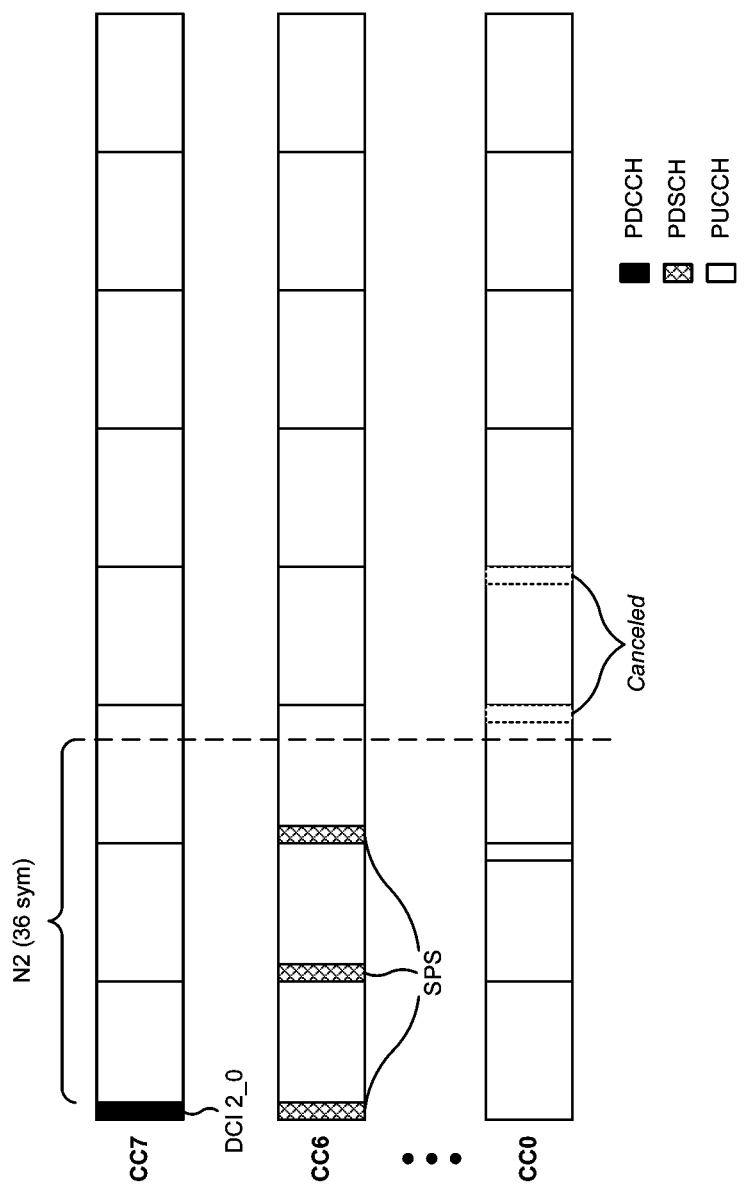
FIGS. 3A and 3B are diagrams illustrating examples of cancellation of a configured communication in a conventional wireless communication system.

As a particular example, with reference to FIG. 3A, a UE may be configured to receive the SPS ultra-reliable low-latency (URLLC) communications on component carrier CC6 (e.g., in a PDSCH) and to transmit ACK/NACK of the SPS URLLC communications on a set of symbols in component carrier CC0 (e.g., in a PUCCH). However, on component carrier CC7, the UE may detect DCI format 2_0 indicating downlink or flexible symbols that overlap the set of symbols to be used for the ACK/NACK, or DCI indicating a CSI-RS or a PDSCH that overlaps the set of symbols to be used for the ACK/NACK. Absent any collision prioritization scheme, the UE may, in this example, cancel uplink communications that have conflicting symbols after N2 symbols from and end of the DCI. Thus, as shown in FIG. 3A, the UE may cancel the transmission of the ACK/NACK of the SPS URLLC in symbols after N2 symbols from an end of the DCI.

Figure 3B:
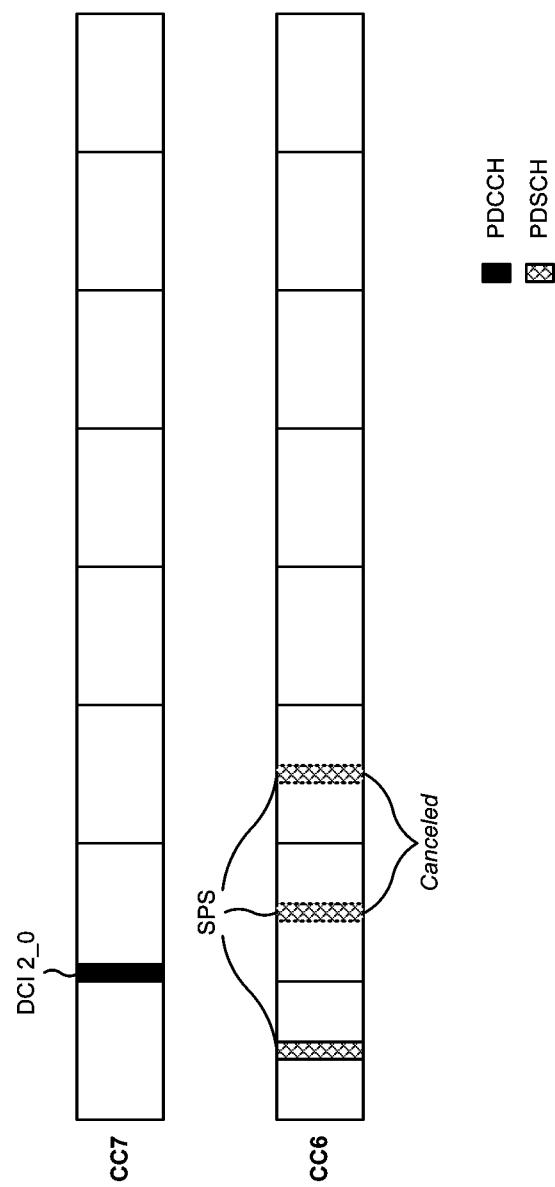

As another particular example, with reference to FIG. 3B, a UE may be configured to receive a CSI-RS or a PDSCH associated with SPS URLLC communications on a set of symbols in component carrier CC6 (e.g., in PDSCH). However, on component carrier CC7, the UE may detect DCI format 2_0 indicating uplink or flexible symbols that overlap the set of symbols to be used for the CSI-RS or PDSCH associated with the SPS URLLC communications, or DCI indicating an uplink communication (e.g., PUSCH, PUCCH, SRS, PRACH, or the like) that overlaps the set of symbols to be used for the CSI-RS or PDSCH associated with the SPS URLLC communications. Absent any collision prioritization scheme, the UE may, in this example, cancel downlink communications that have conflicting symbols after an end of the DCI. Thus, as shown in FIG. 3B, the UE may cancel the reception of the CSI-RS or PDSCH associated with the SPS URLLC communications in symbols after an end of the DCI.

In a wireless communication system in which uplink PHY priority and downlink PHY priority signaling are supported, uplink PHY priority and downlink PHY priority can be used to enable collision prioritization. That is, a PHY priority can be used to resolve a collision between a set of symbols for a configured communication and a set of symbols for which an indicated direction is different from that associated with the configured communication. Some aspects described herein provide techniques and apparatuses for such collision prioritization based on a PHY priority. In some aspects, a UE may determine that a direction of a configured communication, associated with a first set of symbols, is different from an indicated direction for a second set of symbols, where the second set of symbols at least partially overlaps the first set of symbols. Here, the UE may either cancel the configured communication or communicate the configured communication based at least in part on a PHY priority of the configured communication, as described in further detail below.

Further, in some aspects, base station may determine a direction for a second set of symbols based at least in part on a PHY priority of a configured communication associated with a first set of symbols, wherein the second set of symbols at least partially overlaps the first set of symbols. The base station may then provide an indication, associated with the second set of symbols, that includes information indicating the direction for the second set of symbols.

Figure 4:
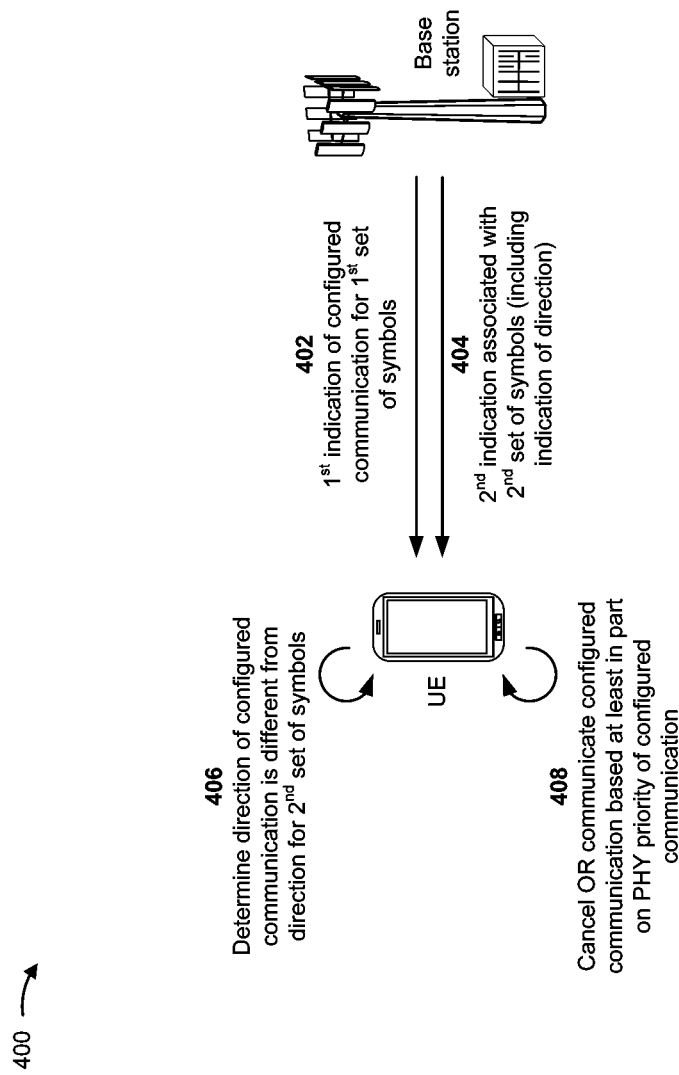
FIG. 4 is a diagram illustrating an example associated with collision prioritization based on PHY priority, in accordance with the present disclosure.

FIG. 4 is a diagram illustrating an example associated with collision prioritization based on PHY priority, in accordance with the present disclosure.

As shown in FIG. 4 by reference 402, a UE (e.g., a UE 120) may receive (e.g., from a base station, such as a base station 110) a first indication of a configured communication for a first set of symbols. In some aspects, the first indication may include information associated with one or more downlink communications that is to be received by the UE. That is, in some aspects, the configured communication may be a downlink communication, meaning that the first set of symbols is indicated to be a set of downlink symbols. For example, the first indication may include information that indicates a set of symbols in which the UE is to receive CSI-RS or PDSCH for SPS URLLC communications. Alternatively, in some aspects, the first indication may include information associated with a communication that is to be transmitted by the UE. That is, in some aspects, the configured communication may be an uplink communication, meaning that the first set of symbols is indicated to be a set of uplink symbols. For example, the first indication may include information that indicates a set of symbols in which the UE is to transmit ACK/NACK associated with SPS URLLC communications.

As shown by reference 404, the base station may detect a second indication associated with a second set of symbols that at least partially overlaps the first set of symbols. In some aspects, the second indication may include information indicating a direction (e.g., uplink, downlink, or flexible) for the second set of symbols. For example, in some aspects, the second indication may be a slot format indicator (SFI) included in DCI, where the SFI indicates a direction (e.g., uplink, downlink, flexible) for the second set of symbols. As another example, in some aspects, the second indication may be a dynamic grant associated with the second set of symbols (e.g., a dynamic grant that schedules an uplink communication in the second set of symbols, a dynamic grant that schedules a downlink communication in the second set of symbols, or the like), where a communication scheduled by the dynamic grant indicates the direction for the second set of symbols. In some aspects, the UE may determine that the second set of symbols at least partially overlaps the first set of symbols (e.g., by comparing the second indication and the first indication).

In some aspects, the UE may receive the second indication from a base station (e.g., base station 110). In some aspects, the base station may determine the direction for the second set of symbols based at least in part on a PHY priority of the configured communication, as described below, and may provide the second indication to the UE.

As shown by reference 406, the UE may determine that the direction of the configured communication is different from the indicated direction for the second set of symbols. For example, the UE may determine that the direction of the configured communication is a downlink direction and the direction associated with the second set of symbols is an uplink direction or a flexible direction and, therefore, may determine that the direction of the configured communication is different from the indicated direction for the second set of symbols. As another example, the UE may determine that the direction of the configured communication is an uplink direction and the direction associated with the second set of symbols is a downlink direction or a flexible direction and, therefore, may determine that the direction of the configured communication is different from the indicated direction for the second set of symbols.

As shown by reference 408, based at least in part on the determination that the direction of the configured communication is different from the indicated direction for the second set of symbols, the UE may cancel the configured communication or may communicate the configuration communication. In some aspects, the UE determine whether to cancel the configured communication or communicate (e.g., transmit or receive) the configured communication based at least in part on a PHY priority of the configured communication. In some aspects, the UE may determine the PHY priority of the configured communication (e.g., an uplink PHY priority for a configured uplink communication, a downlink PHY priority for a configured downlink communication) in a manner described above.

In some aspects, the UE may determine that the configured communication is to be cancelled based at least in part on a determination that the PHY priority of the configured communication is a low PHY priority. For example, when the second indication is an SFI included in DCI, the UE may be configured to cancel the configured communication only if the PHY priority of the configured communication is low. In such a case, the UE may determine that the PHY priority of the configured communication is low and may cancel the configured communication accordingly.

In some aspects, the UE may determine that the configured communication is to be cancelled based at least in part on a determination that the PHY priority of the configured communication is equal to or lower than a PHY priority of a communication scheduled with the indicated direction for the second set of symbols. For example, when the second indication is a dynamic grant, the UE may be configured to cancel the configured communication only if the PHY priority of the configured communication is equal to or lower than a PHY priority of a communication associated with the dynamic grant. In such a case, the UE may determine that the PHY priority of the configured communication is equal to or lower than the PHY priority of the communication associated with the dynamic grant and may cancel the configured communication accordingly. In some aspects, the UE may determine the PHY priority of the communication associated with the dynamic grant in a manner described above.

In some aspects, the UE may determine that the configured communication is to be communicated (e.g., transmitted or received) based at least in part on a determination that the PHY priority of the configured communication is not a low PHY priority. For example, when the second indication is an SFI included in DCI, the UE may be configured to communicate (e.g., not cancel) the configured communication if the PHY priority of the configured communication is not low (e.g., is high). In such a case, the UE may determine that the PHY priority of the configured communication is not low and may proceed with transmitting/receiving the configured communication accordingly.

In some aspects, the UE may determine that the configured communication is to be communicated based at least in part on a determination that the PHY priority of the configured communication is higher than the PHY priority of the communication scheduled with the indicated direction for the second set of symbols. For example, when the second indication is a dynamic grant, the UE may be configured to communicate the configured communication if the PHY priority of the configured communication is higher than the PHY priority of the communication associated with the dynamic grant. In such a case, the UE may determine that the PHY priority of the configured communication is higher than the PHY priority of the communication associated with the dynamic grant and may proceed with transmitting/receiving the configured communication accordingly.

In some aspects, the UE may not expect that the configured communication will have a high PHY priority when the second indication is an SFI included in DCI. In such a case, when determining the direction for the second set of symbols, the base station may determine the direction for the second set of symbols based at least in part on a rule indicating that the direction for the set of symbols is permitted to be different from the direction of the configured communication (only) when the PHY priority of the configured communication is a low PHY priority. In this scenario, the base station may determine the direction for the second set of symbols according to the rule and may provide the second indication to the UE. The UE may receive the second indication and cancel the configured communication (e.g., since the UE does not expect that the configured communication will have a high PHY priority when the second indication is an SFI included in DCI).

In some aspects, the UE may not expect that the configured communication will have a PHY priority that is higher than a communication associated with the second set of symbols when the second indication is a dynamic grant. In such a case, when determining the direction for the second set of symbols, the base station may determine the direction for the second set of symbols based at least in part on a rule indicating that the direction for the set of symbols is permitted to be different from the direction of the configured communication (only) when the PHY priority of the configured communication is equal to or lower than a PHY priority of a communication associated with the second set of symbols. In this scenario, the base station may determine the direction for the second set of symbols according to the rule and may provide the second indication to the UE. The UE may receive the second indication and cancel the configured communication (e.g., since the UE does not expect that the configured communication will have a higher PHY priority than that of a communication schedule in the second set of symbols when the second indication is a dynamic grant).

As indicated above, FIG. 4 is provided as an example. Other examples may differ from what is described with respect to FIG. 4.

Figure 5:
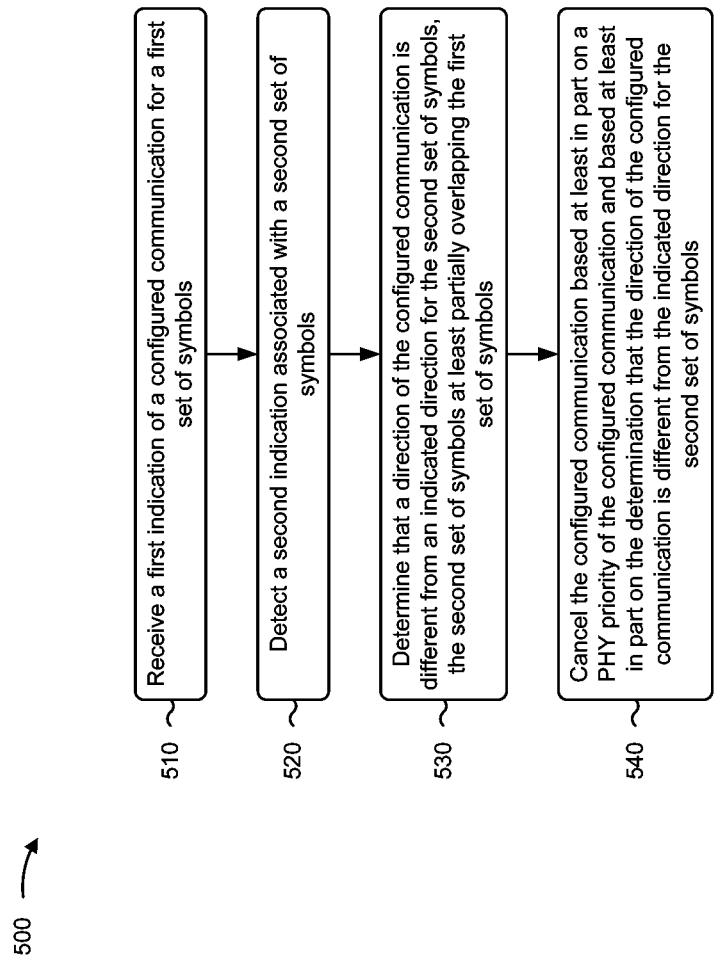
FIGS. 5 and 6 are diagrams illustrating example processes performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with collision prioritization based on PHY priority.

As shown in FIG. 5, in some aspects, process 500 may include receiving a first indication of a configured communication for a first set of symbols (block 510). For example, the UE (e.g., using receive processor 258, transmit processor 264, controller/processor 280, memory 282, and/or the like) may receive a first indication of a configured communication for a first set of symbols, as described above.

As further shown in FIG. 5, in some aspects, process 500 may include detecting a second indication associated with a second set of symbols (block 520). For example, the UE (e.g., using receive processor 258, transmit processor 264, controller/processor 280, memory 282, and/or the like) may detect a second indication associated with a second set of symbols, as described above.

As further shown in FIG. 5, in some aspects, process 500 may include determining that a direction of the configured communication is different from an indicated direction for the second set of symbols, the second set of symbols at least partially overlapping the first set of symbols (block 530). For example, the UE (e.g., using receive processor 258, transmit processor 264, controller/processor 280, memory 282, and/or the like) may determine that a direction of the configured communication is different from an indicated direction for the second set of symbols, the second set of symbols at least partially overlapping the first set of symbols, as described above.

As further shown in FIG. 5, in some aspects, process 500 may include cancelling the configured communication based at least in part on a PHY priority of the configured communication and based at least in part on the determination that the direction of the configured communication is different from the indicated direction for the second set of symbols (block 540). For example, the UE (e.g., using receive processor 258, transmit processor 264, controller/processor 280, memory 282, and/or the like) may cancel the configured communication based at least in part on a PHY priority of the configured communication and based at least in part on the determination that the direction of the configured communication is different from the indicated direction for the second set of symbols, as described above.

Process 500 may include additional aspects, such as any single aspect or any combination of aspects described below and/or in connection with one or more other processes described elsewhere herein.

In a first aspect, the second indication is a slot format indicator included in downlink control information.

In a second aspect, alone or in combination with the first aspect, the configured communication is canceled based at least in part on a determination that the PHY priority of the configured communication is a low PHY priority.

In a third aspect, alone or in combination with one or more of the first and second aspects, the second indication is a dynamic grant associated with the second set of symbols.

In a fourth aspect, alone or in combination with one or more of the first through third aspects, the configured communication is canceled based at least in part on a determination that the PHY priority of the configured communication is equal to or lower than a PHY priority of a communication scheduled with the indicated direction for the second set of symbols.

In a fifth aspect, alone or in combination with one or more of the first through fourth aspects, the direction of the configured communication is a downlink direction and the direction associated with the second set of symbols is an uplink direction or a flexible direction.

In a sixth aspect, alone or in combination with one or more of the first through fifth aspects, the direction of the configured communication is an uplink direction and the direction associated with the second set of symbols is a downlink direction or a flexible direction.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
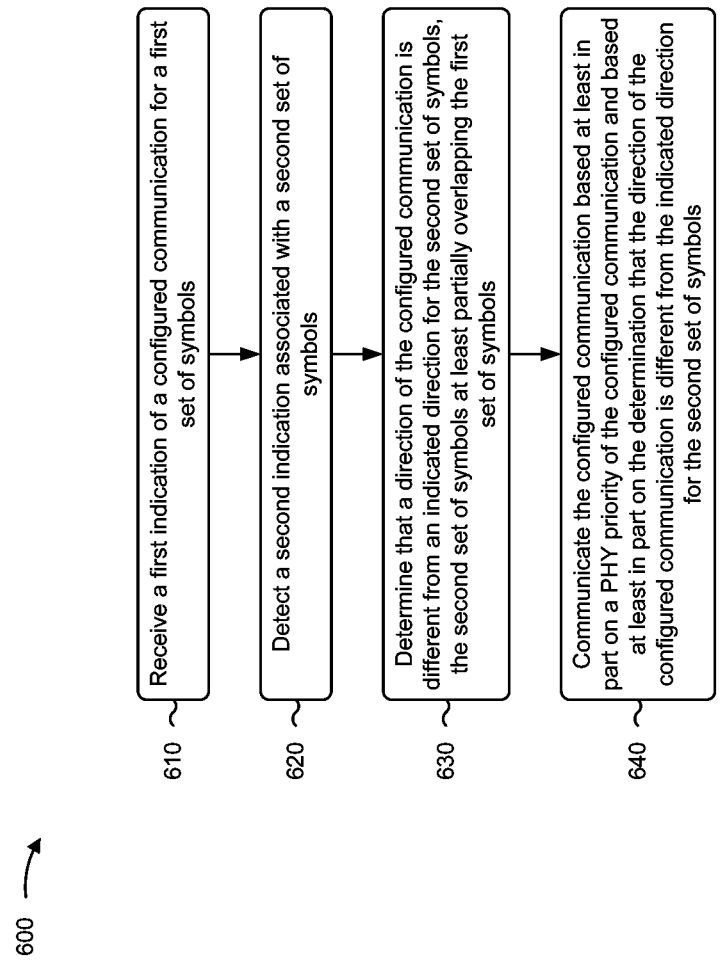

FIG. 6 is a diagram illustrating an example process 600 performed, for example, by a UE, in accordance with the present disclosure. Example process 600 is an example where the UE (e.g., UE 120 and/or the like) performs operations associated with collision prioritization based on PHY priority.

As shown in FIG. 6, in some aspects, process 600 may include receiving a first indication of a configured communication for a first set of symbols (block 610). For example, the UE (e.g., using receive processor 258, transmit processor 264, controller/processor 280, memory 282, and/or the like) may receive a first indication of a configured communication for a first set of symbols, as described above.

As further shown in FIG. 6, in some aspects, process 600 may include detecting a second indication associated with a second set of symbols (block 620). For example, the UE (e.g., using receive processor 258, transmit processor 264, controller/processor 280, memory 282, and/or the like) may detect a second indication associated with a second set of symbols, as described above.

As further shown in FIG. 6, in some aspects, process 600 may include determining that a direction of the configured communication is different from an indicated direction for the second set of symbols, the second set of symbols at least partially overlapping the first set of symbols (block 630). For example, the UE (e.g., using receive processor 258, transmit processor 264, controller/processor 280, memory 282, and/or the like) may determine that a direction of the configured communication is different from an indicated direction for the second set of symbols, the second set of symbols at least partially overlapping the first set of symbols, as described above.

As further shown in FIG. 6, in some aspects, process 600 may include communicating the configured communication based at least in part on a PHY priority of the configured communication and based at least in part on the determination that the direction of the configured communication is different from the indicated direction for the second set of symbols (block 640). For example, the UE (e.g., using receive processor 258, transmit processor 264, controller/processor 280, memory 282, and/or the like) may communicate the configured communication based at least in part on a PHY priority of the configured communication and based at least in part on the determination that the direction of the configured communication is different from the indicated direction for the second set of symbols, as described above.

Process 600 may include additional aspects, such as any single aspect or any combination of aspects described below and/or in connection with one or more other processes described elsewhere herein.

In a first aspect, the second indication is a slot format indicator included in downlink control information.

In a second aspect, alone or in combination with the first aspect, the configured communication is communicated based at least in part on a determination that the PHY priority of the configured communication is not a low PHY priority.

In a third aspect, alone or in combination with one or more of the first and second aspects, the second indication is a dynamic grant associated with the second set of symbols.

In a fourth aspect, alone or in combination with one or more of the first through third aspects, the configured communication is communicated based at least in part on a determination that the PHY priority of the configured communication is higher than a PHY priority of a communication scheduled with the indicated direction for the second set of symbols.

In a fifth aspect, alone or in combination with one or more of the first through fourth aspects, the direction of the configured communication is a downlink direction and the direction associated with the second set of symbols is an uplink direction or a flexible direction.

In a sixth aspect, alone or in combination with one or more of the first through fifth aspects, the direction of the configured communication is an uplink direction and the direction associated with the second set of symbols is a downlink direction or a flexible direction.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
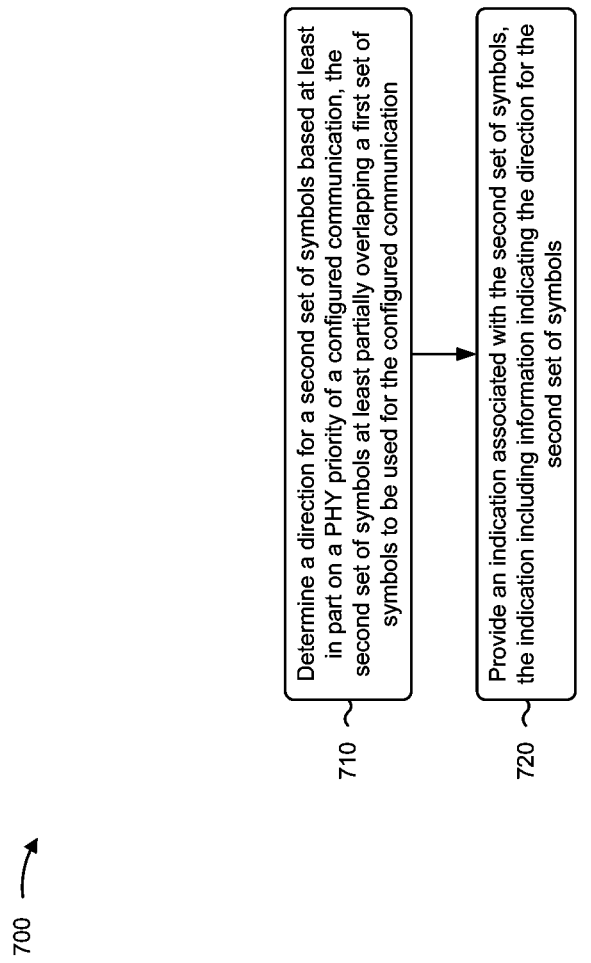
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with collision prioritization based on PHY priority.

As shown in FIG. 7, in some aspects, process 700 may include determining a direction for a second set of symbols based at least in part on a PHY priority of a configured communication, the second set of symbols at least partially overlapping a first set of symbols to be used for the configured communication (block 710). For example, the base station (e.g., using transmit processor 220, receive processor 238, controller/processor 240, memory 242, and/or the like) may determine a direction for a second set of symbols based at least in part on a PHY priority of a configured communication, the second set of symbols at least partially overlapping a first set of symbols to be used for the configured communication, as described above.

As further shown in FIG. 7, in some aspects, process 700 may include providing an indication associated with the second set of symbols, the indication including information indicating the direction for the second set of symbols (block 720). For example, the base station (e.g., using transmit processor 220, receive processor 238, controller/processor 240, memory 242, and/or the like) may provide an indication associated with the second set of symbols, the indication including information indicating the direction for the second set of symbols, as described above.

Process 700 may include additional aspects, such as any single aspect or any combination of aspects described below and/or in connection with one or more other processes described elsewhere herein.

In a first aspect, the indication is a slot format indicator included in downlink control information.

In a second aspect, alone or in combination with the first aspect, the direction for the second set of symbols is permitted to be different from the direction of the configured communication when the PHY priority of the configured communication is a low PHY priority.

In a third aspect, alone or in combination with one or more of the first and second aspects, the indication is a dynamic grant associated with the second set of symbols.

In a fourth aspect, alone or in combination with one or more of the first through third aspects, the direction for the second set of symbols is permitted to be different from the direction of the configured communication when the PHY priority of the configured communication is equal to or lower than a PHY priority of a communication scheduled with the direction for the second set of symbols.

In a fifth aspect, alone or in combination with one or more of the first through fourth aspects, the direction of the configured communication is a downlink direction and the direction associated with the second set of symbols is an uplink direction or a flexible direction.

In a sixth aspect, alone or in combination with one or more of the first through fifth aspects, the direction of the configured communication is an uplink direction and the direction associated with the second set of symbols is a downlink direction or a flexible direction.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
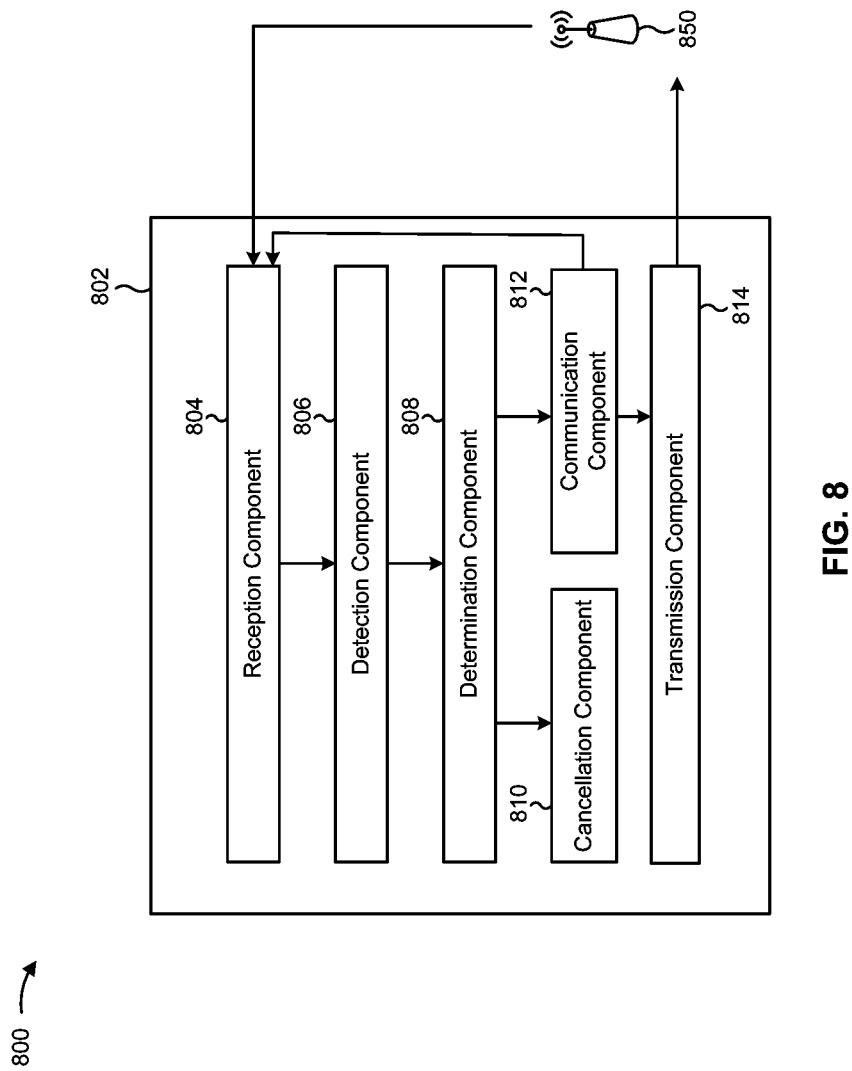
FIG. 8 is a block diagram of an example apparatus for wireless communication, in accordance with the present disclosure.

FIG. 8 is a conceptual data flow diagram 800 illustrating a data flow between different components in an example apparatus 802. The apparatus 802 may be a UE (e.g., UE 120). In some aspects, the apparatus 802 includes a reception component 804, a detection component 806, a determination component 808, a cancellation component 810, a communication component 812, and/or a transmission component 814.

Components of example apparatus 802 may perform operations described herein. For example, in some aspects, reception component 804 may receive a first indication of a configured communication for a first set of symbols. Detection component 806 may detect a second indication associated with a second set of symbols. Determination component 808 may determine that a direction of the configured communication is different from an indicated direction for the second set of symbols, the second set of symbols at least partially overlapping the first set of symbols. In some aspects, cancellation component 810 may cancel the configured communication based at least in part on a PHY priority of the configured communication and based at least in part on the determination that the direction of the configured communication is different from the indicated direction for the second set of symbols. Alternatively, in some aspects, communication component 812 may communicate (e.g., from/to an apparatus 850, which may be a base station 110) the configured communication based at least in part on the PHY priority of the configured communication and based at least in part on the determination that the direction of the configured communication is different from the indicated direction for the second set of symbols.

The apparatus may include additional components that perform each of the blocks of the algorithm in the aforementioned process 500 of FIG. 5, process 600 of FIG. 6, and/or the like. Each block in the aforementioned process 500 of FIG. 5, process 600 of FIG. 6, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

FIG. 9 is a conceptual data flow diagram 900 illustrating a data flow between different components in an example apparatus 902. The apparatus 902 may be a base station (e.g., base station 110). In some aspects, the apparatus 902 includes a reception component 904, a determination component 906, and/or a transmission component 908.

Components of example apparatus 902 may perform operations described herein. For example, in some aspects, determination component 906 may determine a direction for a second set of symbols based at least in part on a PHY priority of a configured communication, the second set of symbols at least partially overlapping a first set of symbols to be used for the configured communication. Transmission component 908 may provide (e.g., to an apparatus 950, which may be a UE 120) an indication associated with the second set of symbols, the indication including information indicating the direction for the second set of symbols.

The apparatus may include additional components that perform each of the blocks of the algorithm in the aforementioned process 700 of FIG. 7 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: receiving a first indication of a configured communication for a first set of symbols; detecting a second indication associated with a second set of symbols; determining that a direction of the configured communication is different from an indicated direction for the second set of symbols, the second set of symbols at least partially overlapping the first set of symbols; and cancelling the configured communication based at least in part on a physical layer (PHY) priority of the configured communication and based at least in part on the determination that the direction of the configured communication is different from the indicated direction for the second set of symbols.

Aspect 2: The method of aspect 1, wherein the second indication is a slot format indicator included in downlink control information.

Aspect 3: The method of any of aspects 1-2, wherein the configured communication is canceled based at least in part on a determination that the PHY priority of the configured communication is a low PHY priority.

Aspect 4: The method of any of aspects 1 and 3, wherein the second indication is a dynamic grant associated with the second set of symbols.

Aspect 5: The method of any of aspects 1, 2, and 4, wherein the configured communication is canceled based at least in part on a determination that the PHY priority of the configured communication is equal to or lower than a PHY priority of a communication scheduled with the indicated direction for the second set of symbols.

Aspect 6: The method of any of aspects 1-5, wherein the direction of the configured communication is a downlink direction and the direction associated with the second set of symbols is an uplink direction or a flexible direction.

Aspect 7: The method of any of aspects 1-5, wherein the direction of the configured communication is an uplink direction and the direction associated with the second set of symbols is a downlink direction or a flexible direction.

Aspect 8: A method of wireless communication performed by a user equipment (UE), comprising: receiving a first indication of a configured communication for a first set of symbols; detecting a second indication associated with a second set of symbols; determining that a direction of the configured communication is different from an indicated direction for the second set of symbols, the second set of symbols at least partially overlapping the first set of symbols; and communicating the configured communication based at least in part on a physical layer (PHY) priority of the configured communication and based at least in part on the determination that the direction of the configured communication is different from the indicated direction for the second set of symbols.

Aspect 9: The method of aspect 8, wherein the second indication is a slot format indicator included in downlink control information.

Aspect 10: The method of any of aspects 8-9, wherein the configured communication is communicated based at least in part on a determination that the PHY priority of the configured communication is not a low PHY priority.

Aspect 11: The method of any of aspects 8 and 10, wherein the second indication is a dynamic grant associated with the second set of symbols.

Aspect 12: The method of any of aspects 8, 9, and 11, wherein the configured communication is communicated based at least in part on a determination that the PHY priority of the configured communication is higher than a PHY priority of a communication scheduled with the indicated direction for the second set of symbols.

Aspect 13: The method of any of aspects 8-12, wherein the direction of the configured communication is a downlink direction and the direction associated with the second set of symbols is an uplink direction or a flexible direction.

Aspect 14: The method of any of aspects 8-12, wherein the direction of the configured communication is an uplink direction and the direction associated with the second set of symbols is a downlink direction or a flexible direction.

Aspect 15: A method of wireless communication performed by a base station, comprising: determining a direction for a second set of symbols based at least in part on a physical layer (PHY) priority of a configured communication, the second set of symbols at least partially overlapping a first set of symbols to be used for the configured communication; and providing an indication associated with the second set of symbols, the indication including information indicating the direction for the second set of symbols.

Aspect 16: The method of aspect 15, wherein the indication is a slot format indicator included in downlink control information.

Aspect 17: The method of any of aspects 15-16 wherein the direction for the second set of symbols is permitted to be different from the direction of the configured communication when the PHY priority of the configured communication is a low PHY priority.

Aspect 18: The method of any of aspects 15 and 17, wherein the indication is a dynamic grant associated with the second set of symbols.

Aspect 19: The method of any of aspects 15, 16, and 18, wherein the direction for the second set of symbols is permitted to be different from the direction of the configured communication when the PHY priority of the configured communication is equal to or lower than a PHY priority of a communication scheduled with the direction for the second set of symbols.

Aspect 20: The method of any of aspects 15-19, wherein the direction of the configured communication is a downlink direction and the direction associated with the second set of symbols is an uplink direction or a flexible direction.

Aspect 21: The method of any of aspects 15-19, wherein the direction of the configured communication is an uplink direction and the direction associated with the second set of symbols is a downlink direction or a flexible direction.

Aspect 22: An apparatus for wireless communication at a device, comprising a processor; memory coupled with the processor; and instructions stored in the memory and executable by the processor to cause the apparatus to perform the method of one or more aspects of aspects 1-7.

Aspect 23: A device for wireless communication, comprising a memory and one or more processors coupled to the memory, the memory and the one or more processors configured to perform the method of one or more aspects of aspects 1-7.

Aspect 24: An apparatus for wireless communication, comprising at least one means for performing the method of one or more aspects of aspects 1-7.

Aspect 25: A non-transitory computer-readable medium storing code for wireless communication, the code comprising instructions executable by a processor to perform the method of one or more aspects of aspects 1-7.

Aspect 26: A non-transitory computer-readable medium storing a set of instructions for wireless communication, the set of instructions comprising one or more instructions that, when executed by one or more processors of a device, cause the device to perform the method of one or more aspects of aspects 1-7.

Aspect 27: An apparatus for wireless communication at a device, comprising a processor; memory coupled with the processor; and instructions stored in the memory and executable by the processor to cause the apparatus to perform the method of one or more aspects of aspects 8-14.

Aspect 28: A device for wireless communication, comprising a memory and one or more processors coupled to the memory, the memory and the one or more processors configured to perform the method of one or more aspects of aspects 8-14.

Aspect 29: An apparatus for wireless communication, comprising at least one means for performing the method of one or more aspects of aspects 8-14.

Aspect 30: A non-transitory computer-readable medium storing code for wireless communication, the code comprising instructions executable by a processor to perform the method of one or more aspects of aspects 8-14.

Aspect 31: A non-transitory computer-readable medium storing a set of instructions for wireless communication, the set of instructions comprising one or more instructions that, when executed by one or more processors of a device, cause the device to perform the method of one or more aspects of aspects 8-14.

Aspect 32: An apparatus for wireless communication at a device, comprising a processor; memory coupled with the processor; and instructions stored in the memory and executable by the processor to cause the apparatus to perform the method of one or more aspects of aspects 15-21.

Aspect 33: A device for wireless communication, comprising a memory and one or more processors coupled to the memory, the memory and the one or more processors configured to perform the method of one or more aspects of aspects 15-21.

Aspect 34: An apparatus for wireless communication, comprising at least one means for performing the method of one or more aspects of aspects 15-21.

Aspect 35: A non-transitory computer-readable medium storing code for wireless communication, the code comprising instructions executable by a processor to perform the method of one or more aspects of aspects 15-21.

Aspect 36: A non-transitory computer-readable medium storing a set of instructions for wireless communication, the set of instructions comprising one or more instructions that, when executed by one or more processors of a device, cause the device to perform the method of one or more aspects of aspects 15-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving a first indication of a configured communication for a first set of symbols;

detecting a second indication associated with a second set of symbols;

determining that a direction of the configured communication is different from an indicated direction for the second set of symbols, the second set of symbols at least partially overlapping the first set of symbols;

determining a first physical layer (PHY) priority of the configured communication based at least in part on the determination that the direction of the configured communication is different from the indicated direction for the second set of symbols; and cancelling the configured communication based at least in part on the first PHY priority of the configured communication being equal to or lower than a second PHY priority of a communication scheduled with the indicated direction for the second set of symbols.

2. The method of claim 1, wherein the second indication is a slot format indicator included in downlink control information.

3. The method of claim 1, wherein the configured communication is canceled based at least in part on a determination that the PHY priority of the configured communication is a low PHY priority.

4. The method of claim 1, wherein the second indication is a dynamic grant associated with the second set of symbols.

5. The method of claim 1, wherein the direction of the configured communication is a downlink direction and the indicated direction for the second set of symbols is an uplink direction or a flexible direction.

6. The method of claim 1, wherein the direction of the configured communication is an uplink direction and the indicated direction for the second set of symbols is a downlink direction or a flexible direction.

7. The method of claim 1, wherein the configured communication is a channel state information reference signal (CSI-RS) or a physical downlink shared channel (PDSCH) for semi-persistent scheduled (SPS) ultra-reliable low-latency (URLLC) communication.

8. A method of wireless communication performed by a user equipment (UE), comprising:
receiving a first indication of a configured communication for a first set of symbols;
detecting a second indication associated with a second set of symbols;
determining that a direction of the configured communication is different from an indicated direction for the second set of symbols, the second set of symbols at least partially overlapping the first set of symbols; and
communicating the configured communication based at least in part on the determination that the direction of the configured communication is different from the indicated direction for the second set of symbols,
wherein the configured communication is communicated based at least in part on a physical layer (PHY) priority of the configured communication being higher than a PHY priority of a communication scheduled with the indicated direction for the second set of symbols.

9. The method of claim 8, wherein the second indication is a slot format indicator included in downlink control information.

10. The method of claim 8, wherein the configured communication is communicated based at least in part on a determination that the PHY priority of the configured communication is not a low PHY priority.

11. The method of claim 8, wherein the second indication is a dynamic grant associated with the second set of symbols.

12. The method of claim 8, wherein the direction of the configured communication is a downlink direction and the indicated direction for the second set of symbols is an uplink direction or a flexible direction.

13. The method of claim 8, wherein the direction of the configured communication is an uplink direction and the indicated direction for the second set of symbols is a downlink direction or a flexible direction.

14. A user equipment (UE) for wireless communication, comprising:
a memory; and
one or more processors coupled to the memory, the one or more processors configured to:
receive a first indication of a configured communication for a first set of symbols;
detect a second indication associated with a second set of symbols;
determine that a direction of the configured communication is different from an indicated direction for the second set of symbols, the second set of symbols at least partially overlapping the first set of symbols;
determine a first physical layer (PHY) priority of the configured communication based at least in part on the determination that the direction of the configured communication is different from the indicated direction for the second set of symbols; and
cancel the configured communication based at least in part on the first PHY priority of the configured communication being equal to or lower than a second PHY priority of a communication scheduled with the indicated direction for the second set of symbols.

15. The UE of claim 14, wherein the second indication is a slot format indicator included in downlink control information.

16. The UE of claim 14, wherein the configured communication is canceled based at least in part on a determination that the PHY priority of the configured communication is a low PHY priority.

17. The UE of claim 14, wherein the second indication is a dynamic grant associated with the second set of symbols.

18. The UE of claim 14, wherein the direction of the configured communication is a downlink direction and the indicated direction for the second set of symbols is an uplink direction or a flexible direction.

19. The UE of claim 14, wherein the direction of the configured communication is an uplink direction and the indicated direction for the second set of symbols is a downlink direction or a flexible direction.

20. The UE of claim 14, wherein the configured communication is a channel state information reference signal (CSI-RS) or a physical downlink shared channel (PDSCH) for semi-persistent scheduled (SPS) ultra-reliable low-latency (URLLC) communication.

21. The UE of claim 14, wherein the configured communication is an acknowledgment (ACK)/negative acknowledgment (NACK) associated with a semi-persistent scheduled (SPS) ultra-reliable low-latency (URLLC) communication.

22. The UE of claim 14, wherein one or more symbols, of the second set of symbols, that overlap the first set of symbols is configured to be used for an acknowledgment (ACK)/negative acknowledgment (NACK).

23. A user equipment (UE) for wireless communication, comprising:
a memory; and
one or more processors coupled to the memory, the one or more processors configured to:
receive a first indication of a configured communication for a first set of symbols;
detect a second indication associated with a second set of symbols;
determine that a direction of the configured communication is different from an indicated direction for the second set of symbols, the second set of symbols at least partially overlapping the first set of symbols; and communicate the configured communication based at least in part on the determination that the direction of the configured communication is different from the indicated direction for the second set of symbols, wherein the configured communication is communicated based at least in part on a physical layer (PHY) priority of the configured communication being higher than a PHY priority of a communication scheduled with the indicated direction for the second set of symbols.

24. The UE of claim 23, wherein the second indication is a slot format indicator included in downlink control information.

25. The UE of claim 23, wherein the configured communication is communicated based at least in part on a determination that the PHY priority of the configured communication is not a low PHY priority.

26. The UE of claim 23, wherein the second indication is a dynamic grant associated with the second set of symbols.

27. The UE of claim 23, wherein the direction of the configured communication is a downlink direction and the indicated direction for the second set of symbols is an uplink direction or a flexible direction.

28. The UE of claim 23, wherein the direction of the configured communication is an uplink direction and the indicated direction for the second set of symbols is a downlink direction or a flexible direction.

* * * * *